United States Patent [19]

Tsuzuki

[11] Patent Number: 4,561,025
[45] Date of Patent: Dec. 24, 1985

[54] INK-JET RECORDING SYSTEM CAPABLE OF RECORDING A HALF-TONE

[75] Inventor: Mitsuo Tsuzuki, Tokyo, Japan
[73] Assignee: NEC Corporation, Tokyo, Japan
[21] Appl. No.: 645,903
[22] Filed: Aug. 29, 1984
[30] Foreign Application Priority Data Aug. 31, 1983 [JP] Japan .............................. 58-159822

[51] Int. Cl.⁴ ...................... H04N 1/22; G01D 15/18
[52] U.S. Cl. ............................... 358/298; 346/140 R; 358/283
[58] Field of Search ................. 346/140; 358/298, 283

[56] References Cited

U.S. PATENT DOCUMENTS 3,828,357  8/1974  Koeblitz .............................. 346/140
4,184,168  1/1980  Isayama .............................. 346/140

Primary Examiner—Joseph W. Hartary
Attorney, Agent, or Firm—Laff, Whitesel, Conte & Saret

[57] ABSTRACT

An ink jet printer is able to print half-tones with greater fidelity. The printer prints an image in half-tones by creating dots having diameters which vary in correspondence to the density of the half-tone at the corresponding point in an image. The diameter of the dot is controlled by controlling the energy content of a driving pulse which creates the dot (e.g. by varying a driving pulse width). When an image point is too light to be realistically printed by the smallest diameter dot that can be made by the printer, no dot is printed. Instead, the signal representing the unprinted dot is stored and added to the signal of a subsequent image point. This way, the dot at the subsequent point is made a little darker to compensate for the non-printing of the preceding dot.

11 Claims, 3 Drawing Figures

INK-JET RECORDING SYSTEM CAPABLE OF RECORDING A HALF-TONE

This invention relates to an ink-jet recording system capable of recording half-tones.

BACKGROUND OF THE INVENTION

An on-demand type ink-jet print head is disclosed in the U.S. Pat. No. 3,946,398 entitled "Method and Apparatus for Recording with Writing Fluids and Drop Projection Means Therefore", issued to Kyser et al. There, an ink droplet is formed by applying a driving pulse to a piezoelectric element installed on a pressure chamber of the ink-jet print heat. As disclosed in the U.S. Pat. No. 4,281,333 entitled "Ink-On-Demand Type Ink-Jet Printer with Coordinated Variable Size Drops with Variable Charges", issued to the present inventors, the droplet size (volume) may be varied by controlling the energy content of a drive pulse. For example, the amplitude and/or the width of the driving pulse may be varied to change the size of a dot recorded on a recording medium.

Therefore, in an ink-jet print head, a half-tone recording can be provided by controlling the energy content of a driving pulse, in response to a signal representing the density of an image to be recorded. However, a droplet-volume range is not so wide that the volume of the ink droplet can be adequately varied. For example, the volumetric ratio of the maximum-sized ink droplet to the minimum-sized ink droplet is between 2–3, at the greatest. Accordingly, the half-tone reproduction range, in which an image recorded at a predetermined density can be reproduced by only varying the volume of the ink droplets, is restricted to about 0.4–1.5 in terms of reflection density. In particular, the half-tone reproducibility of the bright portions of an image is low.

Other known half-tone recording systems include the dither method and the density pattern method. In these methods, the number of dots is increased or decreased in accordance with the density of the image to be recorded, to provide a half-tone reproduction thereof. In order to increase the number of graduations in such an imitation half-tone reproduction system, the number of dots is increased per unit area of the image being subjected to the half-tone reproduction. However, when the dot-recording density of a recording apparatus is constant, the resolution drops.

SUMMARY OF THE INVENTION

It is, therefore, an object of this invention to provide an ink-jet recording system capable of recording a half-tone with a high resolution over a wide level range of images to be recorded.

According to this invention, an ink-jet recording system is capable of recording a half-tone. When the level of a density signal for a point is less than a predetermined value, the ink-jet print head does not eject an ink droplet. Instead, the density signal for the non-printed spot is stored and then adding to a density signal for a subsequent point to provide an added density signal, as the density signal for the subsequent point. The added density signal is compared in level with the predetermined value. These operations are repeated until the level of the added density signal exceeds the predetermined value. When the level of the density signal or the added density signal is equal to or higher than the predetermined value, an energy content of a driving pulse applied to the ink-jet print head is varied in response thereto. Accordingly, a volume of the ink droplet ejected from the ink-jet print head is varied.

Other features and advantages of this invention will be apparent from the following description of a preferred embodiment of this invention taken in conjunction with the accompanying drawings.

DESCRIPTION OF THE PREFERRED EMBODIMENT

Figure 1:
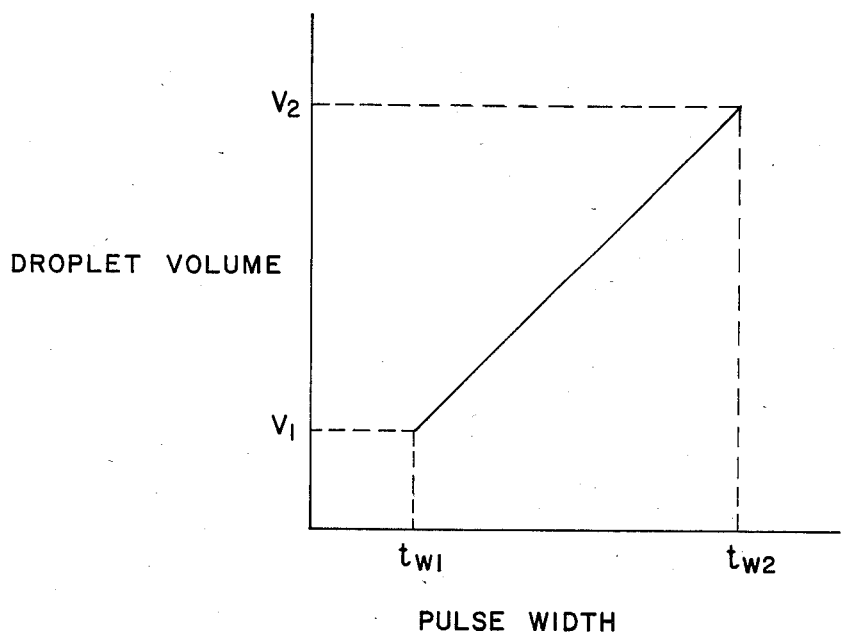
FIG. 1 shows an example of an ink droplet forming characteristic of an ink-jet print head to be used in this invention.

A principle of this invention will be described with reference to FIGS. 1 and 2. An on-demand type ink-jet print head to be used for this invention has a droplet formation characteristic, as shown in FIG. 1. The abscissa of FIG. 1 stands for a pulse width tw of a driving pulse applied to the ink-jet print head. The ordinate of FIG. 1 represents a volume V of an ink droplet ejected from the ink-jet head. As understood from FIG. 1, the volume of the ejected ink droplet is proportional to the pulse width of the driving pulse, over the width range from $t_w1$ to $t_w2$. The pulse width of the driving pulse is determined in response to a density signal which is indicative of the density of the image to be recorded.

Figure 2:
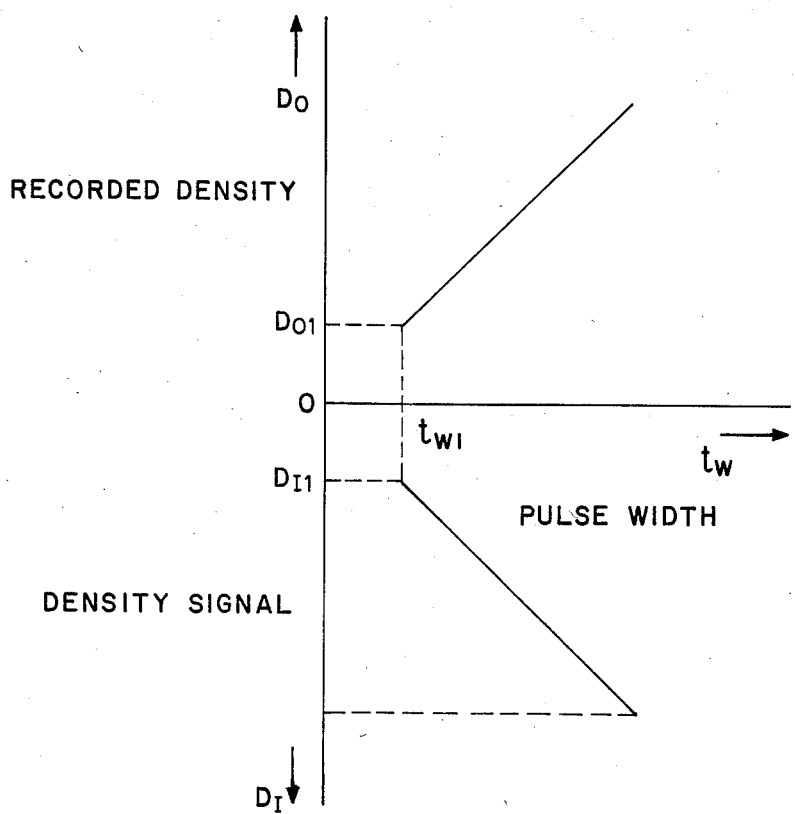
FIG. 2 shows a relationship among a pulse width of a driving pulse, a density signal, and a recorded density for illustrating a principle of this invention.

FIG. 2 shows a relationship betwen the density signal $D_I$ and the pulse width $t_w$, and a relationship between the pulse width $t_w$ and a recorded density $D_0$ on a recording medium on which a half-tone recording is made at a constant dot pitch. A dot of a size corresponding to a level of the density signal $D_I$ can be recorded on the recording medium by selecting the pulse width $t_w$ corresponding to the level of the density signal $D_1$. The density $D_0$ recorded on a medium at a constant dot pitch is proportional to the dot size corresponding to the level of the density signal $D_I$.

According to this invention, when the level of the density signal is equal to or higher than the minimum density signal $D_{I1}$, a driving pulse having a pulse width proportional to the density signal level is applied to the ink-jet head, to record a dot having a size proportional to the density signal level. When the level of the density signal is lower than the minimum density signal $D_{I1}$, there is no ejection of an ink droplet. The sum of this low level density signal and of a density signal at a subsequent point is used as a new density signal for governing the dot size recording of the subsequent point. However, once a dot has been recorded, nothing is added to the density signal for a subsequent point.

Figure 3:
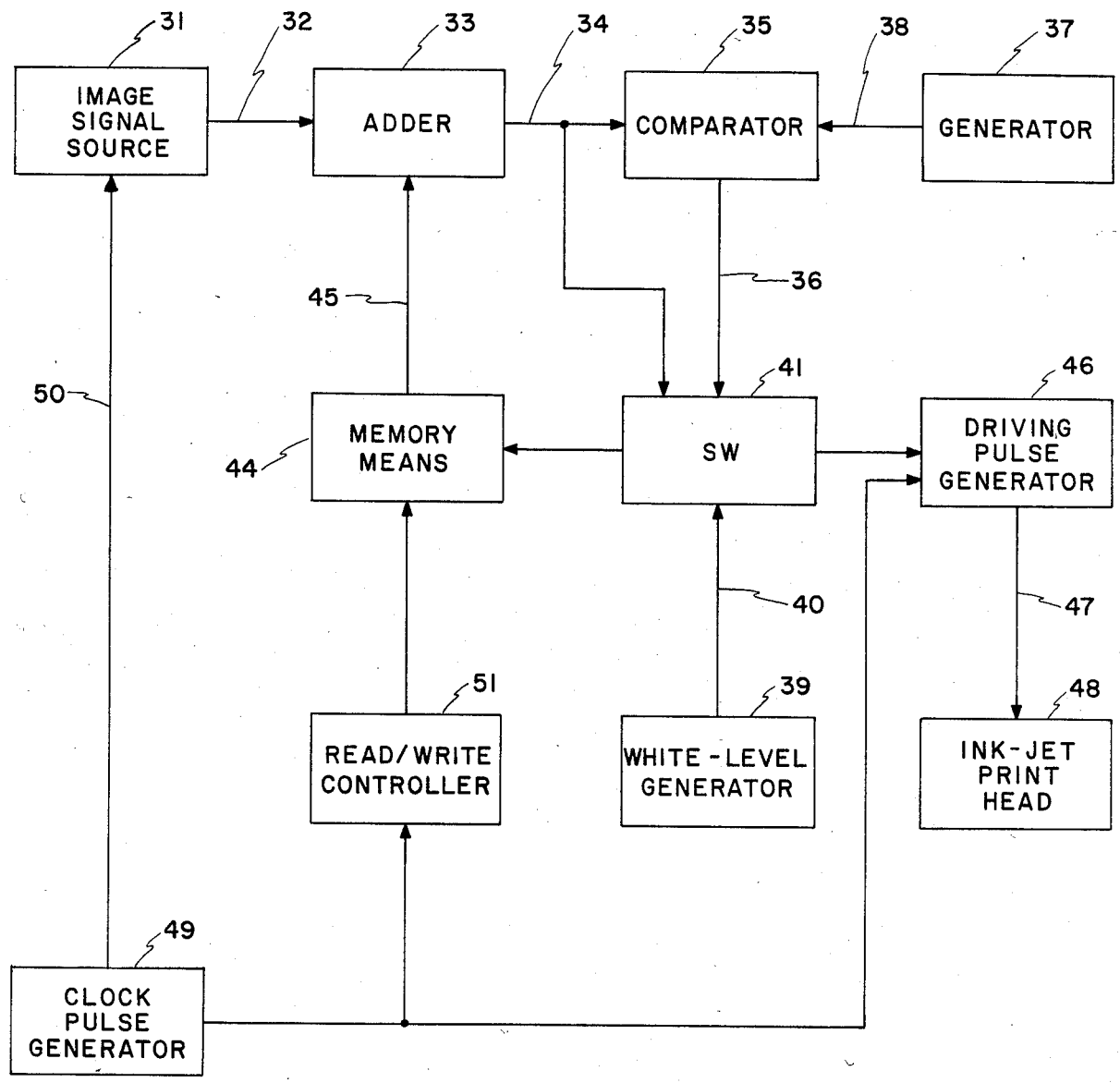
FIG. 3 is a block diagram of an embodiment of this invention.

Referring to FIG. 3, an embodiment of this invention comprises an image signal source 31, an adder 33, a comparator 35, a minimum density signal generator 37, a white-level density signal generator 39, a switch 41, memory means such as a memory and a register 44, a driving pulse generator 46, a clock pulse generator 49, a read/write controller 51, and the ink-jet print head 48.

The image signal source 31 operates in synchronism with a clock pulse appearing on a conductor 50, which is supplied from the clock pulse generator 49. Source 31 generates the density signal on wire 32 which is indicative of the image to be recorded. The density signal 32 is supplied to the adder 33, which is also supplied with a stored density signal appearing on wire 45, from the register 44, under the control of the read/write controller 51. The added density signal on wire 34 is supplied to the comparator 35, which is also supplied with a minimum density signal on wire 38. The minimum density signal is indicative of the minimum density signal level $D_{f1}$ (FIG. 2) which corresponds to a minimum threshold level for recording a dot. The generator 37 supplies the minimum density signal via wire 38.

In the comparator 35, the level of the density signal on wire 34 from the adder 33, is compared with the level of minimum density signal 38, to provide a detection signal that is fed out via wire 36. The detection signal on wire 36 is supplied as a switching signal to the switch 41, which is also supplied with the density signal on wire 34 from the adder 33. Switch 41 also receives a white-level density signal (zero-level signal) via wire 40 from the generator 39.

When the level of density signal on wire 34 is less than the level of minimum density signal on wire 38, the detection signal on wire 36 controls the switch 41 so that the density signal on wire 34 is supplied to the register or memory means 44. The white-level density signal on wire 40 is supplied to the driving pulse generator 46. The register 44 stores the density signal supplied from wire 34 and through the switch 41, under the control of the read/write controller 51. The density signal previously stored in the register 44 is replaced by the new signal. Because the white-level density signal (zero-level signal) on wire 40 is supplied through the switch 41 to the driving pulse generator 46, there is no ejection of the ink droplet in the ink-jet print head 48.

Conversely, when the level of the density signal on wire 34 is equal to or higher than the level of the minimum density signal on wire 38, the detection signal on wire 36 controls the switch 41 so that the density signal on wire 34 is supplied to the driving pulse generator 46. The white-level density signal on wire 40 is supplied to the register 44. The white-level density signal on wire 40 is stored as a new density signal in the register or memory means 44. Therefore, no output is supplied from the register 44 to the adder 33, at a subsequent image point. On the other hand, the driving pulse generator 46 is supplied with the density signal on wire 34 to generate a driving pulse having a pulse width proportional to the density signal on wire 34. This driving pulse is supplied to the ink-jet print head 48, to record a dot having a size corresponding to the density signal on wire 34. The above described operation is performed in synchronism with the clock pulse 50.

As described above, when the level of the density signal on wire 32 is less than the level of the minimum density signal 38, no dot is recorded and the density signal is added to the density signal for a subsequent image point. Accordingly, in such a low-density region, no dot is recorded until the sum of the density signals at several points exceeds the level of the minimum density signal 38. In the higher density region in which the density signal on wire 32 directly indicates that the level of the image to be recorded is higher than the level of the minimum density signal on wire 38, the density signal on wire 32 is supplied through the adder 33 and the switch 41 to the driving pulse generator 46, as it is, to record a dot having the size corresponding to the density signal on the wire 32.

Although the level of the density signal on wire 34 is less than the level of the minimum density signal on wire 38, the signal on wire 34 is stored in the register or memory means 44 for adding to the level of a subsequent point. The dot represented by the stored signal is not recorded. This store operation is repeated until the level of the density signal on wire 34 exceeds the level of the minimum density signal on wire 38, in the above-mentioned embodiment. It is possible to replace the content of the register or memory means 44 (the stored density signal on wire 34) by the white-level density signal on wire 40 when the level of the density signal on wire 34 is less than the level of the minimum density signal on wire 38, for a predetermined number of times, in succession. If the number "4" is selected as the predetermined succession number, in case of the recording density of 8 dots/mm, the lowest resolution is 2 pel/mm. When this number is increased, the half-tone reproduction range expands, with respect to the bright portions, but the resolution deteriorates. It is preferable to select this succession number so that a resolution of at least 0.5 pel/mm is obtained.

In the above description, the pulse-width of the driving pulse is varied in response to the density signal which is indicative of the image to be recorded. It is possible to vary the pulse-width and/or the pulse-amplitude of the driving pulse to control the energy content of the driving pulse in response to the density signal.

Those who are skilled in the art will readily perceive how to modify the invention. Therefore, the appended claims are to be construed to cover all equivalent structures which fall within the true scope and spirit of the invention.

What is claimed is:

1. An ink-jet recording system for recording points in an image as dots on a recording medium, said system comprising:
   means including an ink-jet print head responsive to driving pulses for ejecting ink droplets to record said dots on said recording medium, the volume of said ejected ink droplets corresponding to the energy content of said driving pulses;
   means for generating said driving pulses and for suppling said driving pulses to said ink-jet print head;
   memory means having an output signal corresponding to information stored therein;
   means for adding an image signal indicative of the points of said image being recorded to said output of said memory means;
   means for comparing an output of said adding means with a signal having a predetermined value, means responsive to said comparing means for storing said output of said adding means in said memory means only when the level of said output of said adding means is less than the level of said signal having said predetermined value; and
   means for supplying said output of said adding means to said driving pulse generating means, said energy content of said driving pulse being varied in response to said output of said adding means.

2. The ink-jet recording system as claimed in claim 1, wherein the information stored in said memory means is cleared when said output of said adding means is supplied to said driving pulse generating means, whereby no output of said memory means responsive to said cleared information is supplied to said adding means at a subsequent image point.

3. The ink-jet recording system as claimed in claim 1, wherein at least one of a pulse-width and a pulse-amplitude of said driving pulse is varied in response to said output of said adding means.

4. An ink-jet printer for making half-tone images, said ink-jet printer comprising means for generating successive image signals responsive to a reading of successive image points on a document to be reproduced by said ink-jet printer, each of said image signals having a level which corresponds to the density of a half-tone of said image at a corresponding image point on said document, comparator means responsive to each of said image signals for detecting whether the level of each image signal is above or below a threshold level, drive pulse generating means responsive to said comparator means detecting a high level image signal which is above said threshold level for generating a drive pulse having an energy content corresponding to the level of said high level image signal, memory means responsive to said comparator means detecting a low level image signal which is below said threshold level for storing a memory of said image signal, no driving pulse being generated responsive to a low level image signal which is below said threshold level, means responsive to said memory means for adding said stored low level signal to the next successive image signal, whereby the level of said next successive image signal is increased before it reaches said comparator means, and ink-jet printing means responsive to said drive pulse generating means for ejecting a droplet of ink having a volume corresponding to the energy content of said drive pulse.

5. The printer of claim 4 and clock means for cyclically and periodically driving said image reading means to uniformly scan said image points on said document.

6. The printer of claim 5 and means responsive to said clock means for interrogating said memory means in synchronism with said scanning of said image points whereby signals responsive to a plurality of successive light density image points may be combined to reach the threshold level at which level the volume of said ink droplet is large enough to be printed.

7. The printer of claim 4 and means for erasing said memory after each addition of said stored signal to the next successive image signal.

8. The printer of claim 4 and means for indicating a white image point responsive to a read out of said memory a predetermined number of times without causing said added signal to reach a high image signal level which is above said threshold level.

9. The printer of claim 8 where said predetermined number is "4".

10. The printer of claim 7 and means for causing the width of said drive pulse to vary in order to make the energy content correspond to the level of said image signal.

11. The printer of claim 7 and means for causing the amplitude of said drive pulse to vary in order to make the energy content correspond to the level of said image signal.

* * * * *